US006816548B1

(12) United States Patent
Shiue et al.

(10) Patent No.: US 6,816,548 B1
(45) Date of Patent: Nov. 9, 2004

(54) HDTV CHANNEL EQUALIZER

(75) Inventors: Dong-Chang Shiue, Carmel, IN (US); Kumar Ramaswamy, Indianapolis, IN (US); Paul Gothard Knutson, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 1041 days.

(21) Appl. No.: 09/102,885

(22) Filed: Jun. 23, 1998

(51) Int. Cl.[7] .............................................. H04H 7/40
(52) U.S. Cl. ......................... 375/233; 375/350; 360/65; 348/726
(58) Field of Search ................................ 375/233, 321, 375/350; 360/65; 348/726; 455/47, 204

(56) References Cited

U.S. PATENT DOCUMENTS

| | | | | |
|---|---|---|---|---|
| 5,475,444 | A | 12/1995 | Kim ........................... | 348/608 |
| 5,530,485 | A | 6/1996 | Kim et al. ................... | 348/611 |
| 5,602,602 | A | * 2/1997 | Hulyalkar .................... | 348/607 |
| 5,706,057 | A | 1/1998 | Strolle et al. ............... | 348/426 |
| 5,712,873 | A | 1/1998 | Shiue et al. ................. | 375/233 |
| 5,799,037 | A | * 8/1998 | Strolle et al. ............... | 375/233 |
| 5,898,731 | A | * 4/1999 | Kwak .......................... | 375/230 |
| 6,069,917 | A | * 5/2000 | Werner et al. .............. | 375/233 |

FOREIGN PATENT DOCUMENTS

GB  2 309 140 A  7/1997  ............ H04N/5/21

OTHER PUBLICATIONS

U. E. Kraus et al., Bergische University of Wuppertal, Germany, *An Experimental 8–VSB Demodulator,* International Broadcasting Convention, Sep.12–16 1997, Conference Publication No. 447, ©IEE, 1997, pp. 525–527.

Hyoungsoo Lim et al., Pohang University, Korea, *Low–Complexity Receiver Algorithms for the Grand–Alliance VSB HDTV System,* IEEE Transactions on Consumer Electronics, vol. 42, No. 3, Aug. 1996, pp. 640–650.

Receiver portion of "Grand Alliance HDTV System Specification, Apr. 14, 1994," 6.P.7–6.P.41.

Wayne Bretl et al., Zenith Electronics, *VSB Modem Subsystem Design for Grand Alliance Digital Television Receivers,* IEEE Transactions on Consumer Electronics, vol. 41, No. 3, Aug. 1995, pp. 773–786.

* cited by examiner

Primary Examiner—Dac V. Ha
(74) Attorney, Agent, or Firm—Joseph S. Tripoli; Joseph J. Laks; Ronald H. Kurdyla

(57) ABSTRACT

An adaptive channel equalizer (50) for processing a demodulated VSB signal containing terrestrial broadcast high definition television information includes an adaptive feed forward filter (FFF 20) and an adaptive decision feedback filter (DFF 30). The equalizer is preceded by a demodulator/carrier recovery network (18) and does not include a carrier recovery function in the equalizer control loop. The equalizer FFF and DFF elements operate adaptively in blind, training, and decision-directed modes. A direct connection provided from the equalizer output to the DFF facilitates coarse signal acquisition and equalization during the blind operating mode.

16 Claims, 2 Drawing Sheets

HDTV CHANNEL EQUALIZER

FIELD OF THE INVENTION

This invention concerns adaptive equalization of a video signal transmission channel which may contain high definition television information.

BACKGROUND OF THE INVENTION

The recovery of data from modulated signals conveying digital information in symbol form usually requires three functions at a receiver: timing recovery for symbol synchronization, carrier recovery (frequency demodulation to baseband), and channel equalization. Timing recovery is a process by which a receiver clock (timebase) is synchronized to a transmitter clock. This permits the received signal to be sampled at the optimum point in time to reduce the chance of a slicing error associated with decision-directed processing of received symbol values. Carrier recovery is a process by which a received RF signal, after being frequency down converted to a lower intermediate frequency passband (eg., near baseband), is frequency shifted to baseband to permit recovery of the modulating baseband information.

Many digital data communications systems employ adaptive equalization to compensate for the effects of changing channel conditions and disturbances on the signal transmission channel. The equalization process estimates the transfer function of the transmission channel and applies the inverse of the transfer function to the received signal so as to reduce or eliminate the distortion effects. Channel equalization typically employs filters that remove from a received signal amplitude and phase distortions resulting from a frequency dependent time variant response of the transmission channel, for example, to thereby provide improved symbol decision capability. Equalization removes baseband intersymbol interference (ISI) caused by transmission channel disturbances including the low pass filtering effect of the transmission channel. ISI causes the value of a given symbol to be distorted by the values of preceding and following symbols, and essentially represents symbol "ghosts" since ISI includes advanced and delayed symbols with respect to a reference symbol location in a given decision region.

An adaptive equalizer is essentially an adaptive digital filter. In systems using an adaptive equalizer, it is necessary to provide a method of adapting the filter response so as to adequately compensate for channel distortions. Several algorithms are available for adapting the filter coefficients and thereby the filter response. One widely used method employs the Least Mean Squares (LMS) algorithm. In this algorithm, by varying coefficient values as a function of a representative error signal, the equalizer output signal is forced to approximate a reference data sequence. This error signal is formed by subtracting the equalizer output signal from the reference data sequence. As the error signal approaches zero, the equalizer approaches convergence whereby the equalizer output signal and the reference data sequence are approximately equal.

When the equalizer operation is initiated, the coefficient values (filter tap weights) are usually not set at values which produce adequate compensation of channel distortions. In order to force initial convergence of the equalizer coefficients, a known "training" signal may be used as the reference signal. This signal is programmed at both the transmitter and receiver. The error signal is formed at the receiver by subtracting a locally generated copy of the training signal from the output of the adaptive equalizer. The training signal helps to open the initially occluded "eye" of the received signal, as known. After adaption with the training signal, the "eye" has opened considerably and the equalizer is switched to a decision-directed operating mode. In this mode final convergence of the filter tap weights is achieved by using the actual values of symbols from the output of the equalizer instead of using the training signal. The decision directed equalizing mode is capable of tracking and cancelling time varying channel distortions more rapidly than methods using periodically transmitted training signals. In order for decision directed equalization to provide reliable convergence and stable coefficient values, approximately 90% of the decisions must be correct. The training signal helps the equalizer achieve this 90% correct decision level.

In some systems, however, a training signal is not available. In such case "blind" equalization is often used to provide initial convergence of the equalizer coefficient values and to force the eye to open. In the blind mode, filter coefficients are coarsely adjusted in response to an error signal which is calculated by employing a known function, or algorithm. Among the most popular blind equalization algorithms are the Constant Modulus Algorithm (CMA) and the Reduced Constellation Algorithm (RCA). These algorithms are discussed, for example, in Proakis, *Digital Communications*, McGraw-Hill: New York, 1989 and in Godard, Self-Recovering Equalization and Carrier Tracking in Two Dimensional Data Communication Systems," *IEEE Transactions on Communications*, November 1980. Briefly, the CMA relies on the fact that, at the decision instants, the modulus of the detected data symbols should lie on a locus of points defining one of several (constellation) circles of different diameters. The RCA relies on forming "super constellations" within the main transmitted constellation. The data signal is first forced to fit into a super constellation, then the super constellation is subdivided to include the entire constellation.

In a conventional system using a feed forward filter (FFF) and a decision feedback filter (DFF) as equalizers, the FFF typically performs adaptive blind equalization (not decision-directed) during the initial signal acquisition interval. The DFF does not provide equalization at this time. At the end of the blind equalization interval, the DFF is activated for decision-directed equalization. In the decision-directed mode, filter coefficients are updated to finer values by using a decision error signal which is calculated by using a known decision function. At this time both the FFF and the DFF have their coefficients adapted (updated) in response to locally generated control signals in a decision-directed mode, eg., based on differences between symbol samples appearing at the input and the output of a slicer network. This approach has disadvantages. If significant ISI and ghost effects are present, it will be difficult for the FFF to achieve equalization since the filter center tap will be contaminated by symbol "ghosts." To equalize pre- and post-ghosts, the FFF employs both pre-cursor and post-cursor taps. The post-cursor taps of the FFF overlap with the post-cursor taps of the DFF, which is not an efficient use of filter taps. This limitation is avoided by a system of the type described in U.S. Pat. No. 5,712,873-Shiue et al. In that system, a digital signal processor includes a decision feedback filter (DFF) which exhibits different operating modes before and during decision-directed equalization. Specifically, the DFF operates as a linear feedback filter during blind equalization, and as a non-linear filter in the decision-directed mode after blind equalization.

SUMMARY OF THE INVENTION

In accordance with the principles of the present invention, a digital channel equalizer for processing a demodulated VSB signal containing high definition video information comprises a feed forward filter (FFF) and a decision feedback filter (DFF). Both the FFF and DFF operate adaptively in both blind and decision-directed modes.

DETAILED DESCRIPTION OF THE DRAWING

In the Figure, a modulated analog HDTV signal received by an antenna 10 is processed by an input network 14 including RF tuning circuits, a double conversion tuner for producing an intermediate frequency passband output signal, and appropriate gain control circuits, for example. The received signal is a VSB modulated signal as proposed for use by the Grand Alliance HDTV system in the United States. Such a VSB signal is represented by a one-dimensional data symbol constellation wherein only one axis contains quantized data to be recovered by the receiver. To simplify the Figure, not shown are signals for clocking the illustrated functional blocks or a timing recovery network (as known) for deriving timing and clock signals from the received signal.

Figure 1:
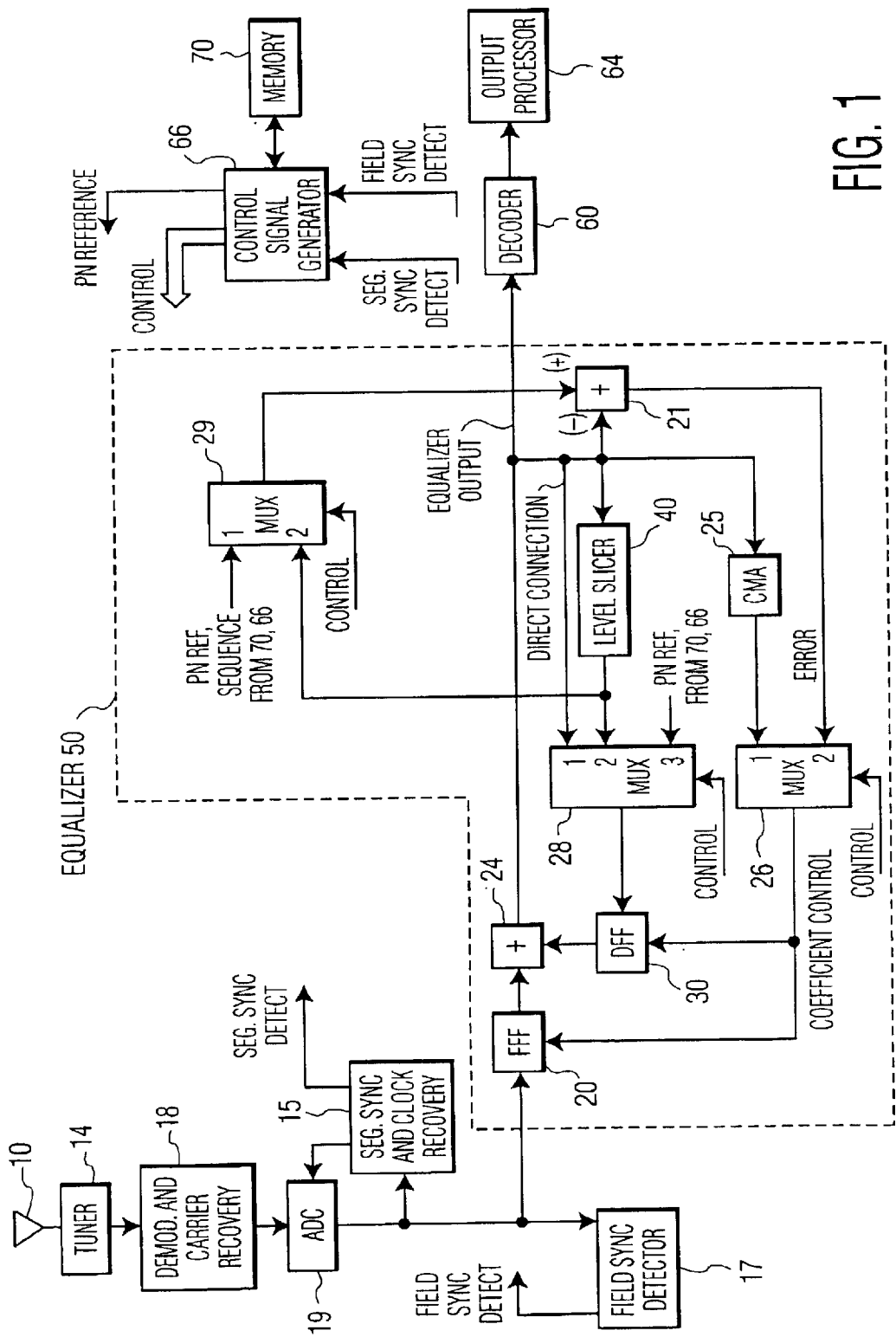
FIG. 1 is a block diagram of a portion of an advanced television receiver, such as a high definition television (HDTV) receiver, including an adaptive equalizer system according to the principles of the present invention.
Figure 2:
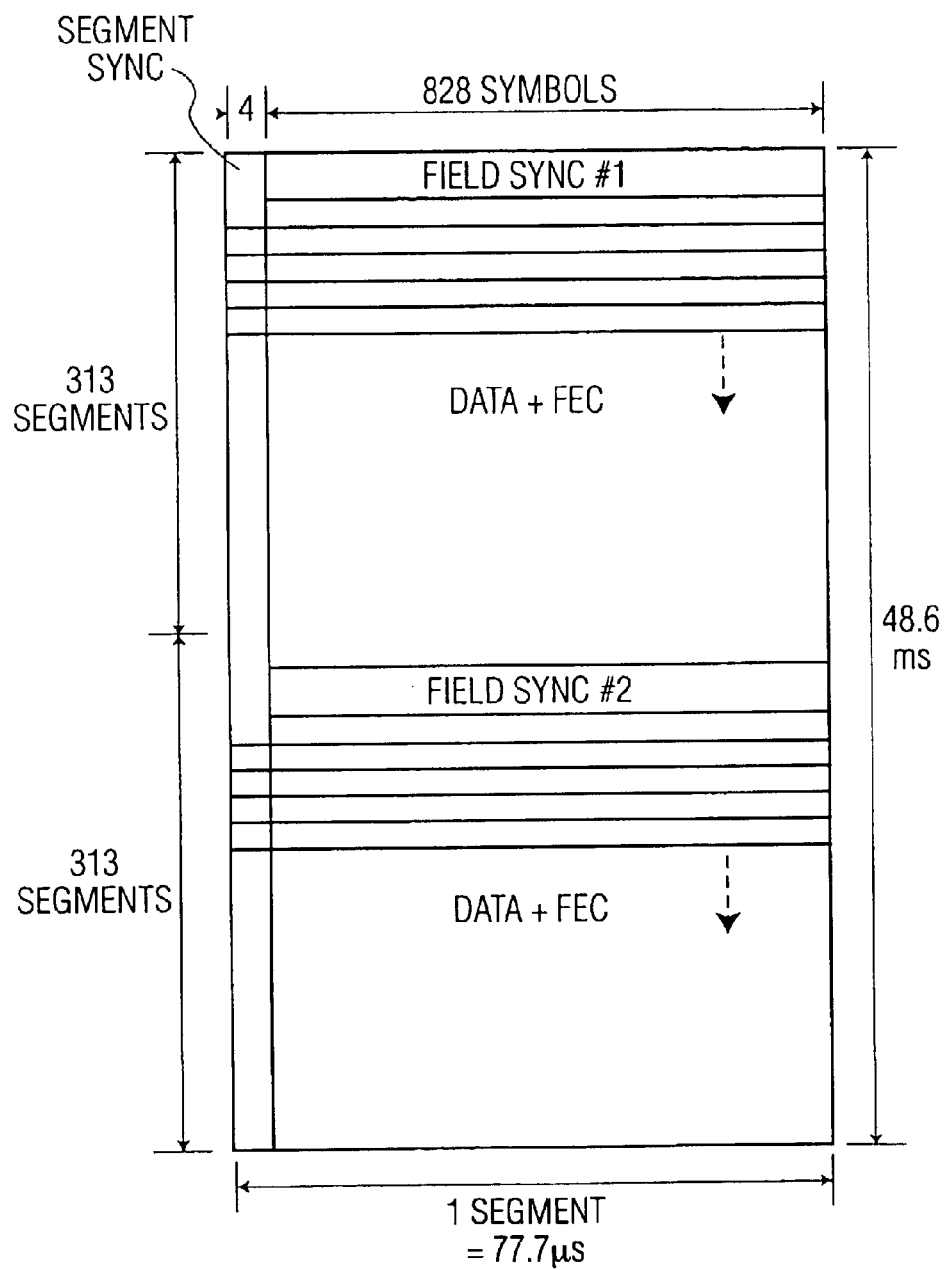
FIG. 2 depicts a data frame format for a VSB signal according to the Grand Alliance HDTV system.

As described in the Grand Alliance HDTV System Specification dated Apr. 14, 1994, the VSB transmission system transmits data with a prescribed data frame format as shown in FIG. 2. A small pilot signal at the suppressed carrier frequency is added to the transmitted signal to help achieve carrier lock at a VSB receiver. Referring to FIG. 2, each data frame comprises two fields with each field including 313 segments of 832 multilevel symbols. The first segment of each field is referred to as a field segment, and the remaining 312 segments are data segments. The data segments contain MPEG compatible data packets. Each data segment comprises a four symbol segment sync character followed by 828 data symbols. Each field segment comprises a four symbol segment sync character followed by a field sync component comprising a predetermined 511 symbol pseudorandom number (PN) sequence and three predetermined 63 symbol PN sequences, the middle one of which is inverted in successive fields. A VSB mode control signal (defining the VSB symbol constellation size follows the last 63 PN sequence, which is in turn followed by 96 reserved symbols and 12 symbols copied from the previous field.

The passband output signal from unit 14 is converted to a baseband signal by VSB demodulator and carrier recovery network 18. In this example network 18 contains circuits arranged as described in the Grand Alliance HDTV System Specification, and in an article by W. Bretl et al., "VSB Modem Subsystem Design for Grand Alliance Digital Television Receivers," IEEE Transactions on Consumer Electronics, August 1995. Briefly, carrier recovery may be performed by a frequency and phase locked loop using the small pilot signal component included in the broadcast HDTV VSB signal. The output baseband signal from network 18 contains only recovered I-channel data symbols along a real axis. The demodulated symbol information from network 18 is converted to a digital datastream by an analog to digital converter 19.

Data segment synchronization recovery and clock (timing) recovery are performed by unit 15, which may include networks as described in the Grand Alliance HDTV System Specification and in the Bretl et al. article mentioned previously. A Segment Sync Detect Signal is provided when data segment synchronization and timing recovery have been achieved.

The output of analog to digital converter 19 is also applied to a data field (frame) sync component detector 17. Networks suitable for providing data field (frame) sync component detection also are discussed in the Grand Alliance HDTV specification and in the Bretl et al. article. Detector 17 provides a Field Sync Detect output signal to microprocessor 66 when the data field sync component has been detected. The digital data from unit 19 is processed by an adaptive equalizer network 50 as will be discussed. An equalized baseband output signal from network 50 is decoded by unit 60 and processed by output network 64. Decoder 60 includes, for example, trellis decoding, data de-interleaver, Reed-Solomon error correction and audio/video decoder networks as known and described, for example, in the Bretl article mentioned above. Output processor 64 includes audio/video processors and audio/video reproduction devices.

The segment sync and field sync detection circuits in units 15 and 17 provide output Segment Sync Detect and Field Sync Detect input signals to control signal generator 66 (eg., including a microprocessor) when these sync components of the received signal are detected. Microprocessor 66 responds to these signals for providing output Control signals and an output reference PN (pseudorandom number sequence) signal to equalizer 50 as will be discussed. The PN training signal sequence is a fixed repetitive pattern of binary data as specified by the Grand Alliance HDTV specification, and is a preprogrammed reference signal acquired by control signal generator 66 from memory 70. Since the data pattern of the stored PN signal is known, an exact error is generated by obtaining the difference between the stored reference PN signal and the PN training signal component of the received datastream during the field sync interval. The Control signals control the switching of Multiplexers 26, 28 and 29 in the blind, training and decision-directed operating modes as will be discussed.

The output signal from unit 19 contains digital data as well as inter-symbol interference (ISI) caused by transmission channel disturbances and artifacts. This signal is applied to a real (in contrast to a complex) feed-forward filter (FFF) 20 operating as an equalizer, eg., a symbol rate spaced ("T-spaced") equalizer, which in this case is implemented as a digital FIR filter. The coefficient values (tap weights) of equalizer filter 20 are adaptively controlled by a Coefficient Control signal from multiplexer 26 as will be discussed.

The equalized signal from filter 20 is combined by an adder 24 with an equalized signal from a decision feedback filter 30 operating as an equalizer. DFF 30 removes intersymbol interference not removed by FFF 20. The coefficient values (tap weights) of equalizer filter 30 also are adaptively controlled by the Coefficient Control signal (i.e., the switched Error signal) from multiplexer 26. The input signal to be equalized by DFF 30 is provided from multiplexer 28. Both FFF 20 and DFF 30 have coefficient values adapted (updated) in response to the Coefficient Control signal during blind and decision directed operation modes. Both FFF 20 and DFF 30 are digital FIR filters which individually perform equalizing functions. When considered together, these filters represent an aggregate equalizer 50 for equalizing the input signal to decoder 60. FFF 20 equalizes pre-ghost components, while DFF 30 equalizes post-ghost components. FFF 20 and DFF 30 operate in a linear infinite impulse response (IIR) mode from the time the input signal is initially received. Both FFF 20 and DFF 30 are FIR devices, but feedback operation causes DFF 30 to operate as an IIR device.

The output signal from adder 24 is the output signal of equalizer 50. The output of adder 24 is coupled to a network including multiplexers 26 and 28, a slicer 40, a subtractive combiner 21 and a source 25 which provides a CMA blind adaption algorithm.

Mux 26 provides either of two signals to coefficient control inputs of FFF 20 and DFF 30 in response to a Control signal produced by microprocessor 66 for various operating modes when field sync and segment sync components are detected, as will be explained. These signals from Mux 26 include the CMA blind adaption algorithm from unit 25 which responds to the Equalizer Output signal, and an Error signal from the output of subtractive combiner 21. The Error signal represents the difference between the input signal of slicer 40 and the output of a third multiplexer 29. The output of combiner 21 is either a slice Error signal or a training Error signal, where slice Error=output of slicer 40−equalizer output training Error=PN reference signal−equalizer output When generating the training Error signal, the equalizer output is the PN component of the received datastream.

Mux 28 provides either of three input signals to a signal input of DFF 30 in response to a Control signal from microprocessor 66. These signals include the equalizer 50 output signal as applied via a direct connection to a first input (1) of Mux 28, the output signal from slicer 40 applied to a second input (2) of Mux 28, and the stored PN reference signal from memory 70 and unit 66 applied to a third input (3) of Mux 28.

Multiplexer 29 responds to a switching Control signal from microprocessor 66 and receives as inputs the reference PN training signal sequence during field sync intervals, and the output signal from slicer 40 at other times. The output of Mux 29 is applied to subtractive combiner 21 where it is differenced with the output signal from equalizer 50 to produce the Error signal. The Error signal represents either the difference between the slicer 40 and the equalizer 50 output signals, or the difference between the reference PN signal and the PN signal component of the received datastream as contained in the equalizer 50 output signal.

In operation, equalizer 50 exhibits an initial condition, a blind operating mode, a data-directed training mode, a decision-directed mode, and a steady-state equalized condition. The blind mode occurs when the characteristic eight level "eye" pattern of the received 8-VSB signal exhibits a closed eye pattern. Training and decision-directed operation occur afterwards, when the "eye" exhibits an open eye pattern. It is noted that it is not necessary for the "eye" pattern to open if the received training signal component is detected immediately. In such case the training signal component is used as soon as it is detected, even before the "eye" pattern opens.

In the initial condition, before timing lock (timing synchronism) is achieved, FFF 20 and DFF 30 idle while demodulator 18 attempts to lock the received signal with respect to automatic gain control (AGC), timing and carrier. At this time Control signals applied to Mux 26 and 28 cause the coefficient values of all taps of FFF 20 and DFF 30 to be reset and held at a zero value, except for one tap value which is reset to a predetermined non-zero initial value. This action of the Control signals freezes the filter coefficient values to prevent unwanted random changes in coefficient values before the actual useful equalization process begins. Alternatively, FFF 20 and DFF 30 can be pre-loaded with the last-known valid coefficient values. In this initial state both Mux 26 and 28 exhibit a zero output. The output of Mux 29 is a "don't care" condition at this time.

The process of blind equalization using the CMA algorithm begins next, after coarse timing is achieved. This occurs when the segment sync component of the received signal is detected. Carrier lock and AGC lock are present. At such time the Segment Sync Detect signal is conveyed to microprocessor 66, which in turn generates appropriate Control signals. The process of blind equalization involves the use of the CMA algorithm before the field sync component of the received signal is detected. Specifically, a Control signal applied to Mux 26 causes Mux 26 to convey the CMA algorithm from its input (1) to the coefficient control inputs of FFF 20 and DFF 30, and a Control signal applied to Mux 28 causes Mux 28 to convey the equalizer output signal from its input (1) to the signal input of DFF 30. The output of Mux 29 is a "don't care" condition during the blind equalizing interval.

The processes of training and decision-directed equalization occur next, when timing lock is achieved after the field sync component is detected. The training mode occurs when the received PN signal component is available during the field sync interval of each data frame. The decision-directed mode occurs at other times during each data frame. The presence of the field sync component initiates the start of the PN sequence training mode. At such time the Field Sync Detect signal is conveyed to microprocessor 66, which in turn generates appropriate Control signals. During field sync intervals when the received PN training component is available and the reference PN signal is acquired from memory 70, the Control signals respectively applied to Mux 26, 28 and 29 cause (a) a training Error signal to be coupled to the coefficient control inputs of FFF 20 and DFF 30 via Mux 26, (b) the reference PN signal to be conveyed to the signal input of DFF 30 via Mux 28, and (c) the reference PN signal to be coupled to combiner 21 via Mux 29.

During non-field sync intervals of each data frame when slicer-based decision-directed equalization is being performed, the Control signals respectively applied to Mux 26, 28 and 29 cause (a) a slice Error signal to be coupled to the coefficient control inputs of FFF 20 and DFF 30 via Mux 26, (b) the output of slicer 40 to be conveyed to the signal input of DFF 30 via Mux 28, and (c) the output of slicer 40 to be coupled to combiner 21 via Mux 29.

During steady state operation after equalization has been achieved, the signal conditions described above for decision-directed operation prevail.

The operation of equalizer 50 described above is summarized by the following table.

| Operating Mode | Mux 26 to FFF, DFF Coefficient Control | Mux 28 to DFF Signal input | Mux 29 output |
|---|---|---|---|
| Initial state | 0 | 0 | - - - |
| Blind Eq. | CMA | Equal. Output | - - - |
| Training (field sync interval) | training Error | ref. PN signal | ref. PN |
| Decision Dir. (non-field sync int.) | slice Error | slicer out. | slicer out. |

The disclosed system including adaptive equalizer 50 advantageously exhibits reduced cost and hardware complexity. Equalizer 50 comprises real rather than complex filters 20 and 30, and does not require the use of rotator or de-rotator circuits (eg., in the equalizer control loop). A rotator/derotator is basically a circuit for circularly translating a data symbol constellation to compensate for unwanted frequency and phase offsets in a received signal.

Adaptive equalizer 50 operates as a linear IIR filter, thereby improving the equalizer capabilities since DFF 30 provides some equalization even in the blind mode when DFF 30 operates as a linear feedback filter, before operating as a non-linear filter in the decision-directed mode following blind equalization. The initial operation of DFF 30 as a linear feedback filter produces some convergence which facilitates system equalization, particularly in the presence of significant signal ghosts. In particular, at this time DFF 30 exhibits the ability of a feedback filter to cancel distant ghost components.

In addition, the disclosed system exhibits a smoother transition from a linear operating mode to a non-linear decision-directed mode after blind equalization, compared to a conventional system using FFF and DFF equalization. This is because DFF 30 begins operation in the non-linear mode after having been pre-conditioned by operating in the linear mode, i.e., many of its coefficients have been adapted in the direction of final values.

Equalizer 50 is essentially a hardware and data efficient adaptive recursive linear filter that takes advantage of all available data to achieve equalization for a high definition VSB modulated signal as soon as possible. Both FFF 20 and DFF 30 operate at the symbol rate, and a PN sequence is used to facilitate fast equalization. Data processing occurs continuously on-line in real time, and advantageously uses a direct connection from the output of equalizer 50 to DFF 30 via Mux 28 to allow DFF 30 to facilitate coarse signal acquisition during the blind operating mode. Thus decision feedback filter 30 is advantageously used in a linear mode during blind equalization, then responds to a PN signal in the training mode, and to the slicer output during the decision-directed mode, as discussed.

What is claimed is:

1. A system for processing a received Vestigial Sideband (VSB) modulated signal containing high definition video information represented by a VSB constellation of symbols and subject to exhibiting unwanted perturbations, comprising:

a demodulator responsive to said received VSB modulated signal for producing a baseband demodulated signal; and an adaptive equalizer having an input for receiving said baseband demodulated signal and an output at which an equalized baseband signal is produced, said adaptive equalizer including (a) an adaptive feed forward filter (FFF) for equalizing said demodulated signal, said FFF exhibiting (1) linear, non-decision directed blind operation in a first operating mode, and (2) decision-directed operation in a subsequent second operating mode; and (b) an adaptive decision feedback filter (DFF) for equalizing said demodulated signal, said DFF exhibiting (1) linear, non-decision directed blind operation in said first operating mode, and (2) non-linear decision-directed operation in said second operating mode.

2. A system according to claim 1, wherein
said demodulator includes a carrier recovery network; and
said FFF and said DFF do not perform carrier derotation.

3. A system according to claim 1, wherein
said signal input of said DFF is directly connected to said equalized signal at said equalizer output during said blind operation in said first mode.

4. A system according to claim 3, wherein
said signal input of said DFF receives a slicer output signal during said decision-directed operation in said second mode.

5. A system according to claim 1, wherein
said feed forward filter and said decision feedback filter operate at a symbol rate, on-line in real time.

6. A system for processing a received Vestigial Sideband (VSB) modulated signal containing high definition video data represented by a VSB constellation of symbols and subject to exhibiting unwanted perturbations, said data having a data frame format constituted by a succession of data frames comprising a field sync component prefacing a plurality of data segments having an associated segment sync component, comprising:

a demodulator responsive to said received VSB modulated signal for producing a baseband demodulated signal; and an adaptive equalizer having an input for receiving said demodulated baseband signal and an output at which an equalized baseband signal is produced, said adaptive equalizer including (a) an adaptive feed forward filter (FFF) for equalizing said demodulated signal, said FFF exhibiting (1) a linear, blind operating mode, and (2) a subsequent non-linear decision-directed operating mode; and (b) an adaptive decision feedback filter (DFF) for equalizing said demodulated signal, said DFF exhibiting (1) a linear, blind operating mode, and (2) a subsequent non-linear decision-directed operating mode.

7. A system according to claim 6, wherein
in said blind mode said signal input of said DFF is directly connected to said equalized signal at said equalizer output, and coefficient control inputs of said FFF and DFF respond to a blind adaption algorithm; and in said decision mode said DFF signal input responds to a slicer output signal, and coefficient control inputs of said FFF and DFF respond to an error signal representing the difference between said slicer output signal and said equalizer output signal.

8. A system according to claim 7, wherein
said DFF responds to a training signal during field sync intervals and responds to said slicer output signal during non-field sync intervals;

during non-field sync intervals of a data frame, coefficient control inputs of said FFF and DFF respond to a slice error signal representing the difference between a slicer output signal and said equalizer output signal; and during field sync intervals of a data frame, coefficient control inputs of said FFF and DFF respond to a training error signal representing the difference between a training signal component of said equalizer output signal and a reference training signal.

9. A system according to claim 8, wherein
said training signal is a PN sequence.

10. A system according to claim 6, wherein
said feed forward filter and said decision feedback filter operate at a symbol rate, on-line in real time.

11. In a system for processing a received Vestigial Sideband (VSB) modulated signal containing high definition video information represented by a VSB constellation of symbols and subject to exhibiting unwanted perturbations, said system including a channel equalizer comprising a feedforward filter (FFF) and a decision-feedback filter (DFF) for producing an equalized output signal, a signal processing method comprising the steps of:

demodulating said VSB modulated signal to produce a baseband demodulated signal; conveying said demodulated baseband signal to said equalizer;

linearly adapting said FFF during an blind first operating mode;

linearly adapting said DFF during said blind operating mode;

non-linearly adapting said FFF in a subsequent decision-directed operating mode; and non-linearly adapting said DFF in a subsequent decision-directed operating mode.

12. A method according to claim 11, wherein said step of linearly adapting said DFF during said blind operating mode includes the step of directly connecting said equalized output signal to a signal input of said DFF during said blind operating mode to permit coarse equalization by said DFF during said blind mode.

13. In a system for processing a received Vestigial Sideband (VSB) modulated signal containing high definition video data represented by a VSB constellation of symbols and subject to exhibiting unwanted perturbations, said data having a data frame format constituted by a succession of data frames comprising a field sync component prefacing a plurality of data segments having an associated segment sync component, said system including a feedforward filter (FFF) and a decision-feedback filter (DFF) constituting a channel equalizer for producing an equalized output signal, a signal processing method comprising the steps of:

demodulating said VSB modulated signal to produce a baseband demodulated signal;

conveying said demodulated baseband signal to said equalizer;

linearly adapting said FFF during a blind first operating mode;

linearly adapting said DFF during said blind operating mode;

non-linearly adapting said FFF in a subsequent decision-directed operating mode; and non-linearly adapting said DFF in said subsequent decision-directed operating mode.

14. A method according to claim 13, comprising the step of directly connecting said equalized output signal to a signal input of said DFF during said blind operating mode to permit coarse equalization by said DFF during said blind mode.

15. A method according to claim 13, comprising the further steps of:

generating a slicer output signal in response to said equalizer output signal;

coupling said slicer output signal to a signal input of said DFF in said decision-directed mode; and coupling an error signal representing the difference between said slicer output signal and said equalizer output signal to coefficient control inputs of said FFF and DFF during said decision-directed mode.

16. In a system for processing a received Vestigial Sideband (VSB) modulated signal containing high definition video data represented by a VSB constellation of symbols and subject to exhibiting unwanted perturbations, said data having a data frame format constituted by a succession of data frames comprising a field sync component prefacing a plurality of data segments having an associated segment sync component, said system including a feedforward filter (FFF) and a decision-feedback filter (DFF) constituting a channel equalizer for producing an equalized output signal, a signal processing method comprising the steps of:

demodulating said VSB modulated signal to produce a baseband demodulated baseband signal;

applying said demodulated signal to said channel equalizer constituted by said FFF and said DFF;

(a) during a blind, non-decision directed equalizing interval,
    (1) applying said equalizer output signal to a signal input of said DFF;
    (2) adapting said FFF in a linear manner;
    (3) adapting said DFF in a linear manner;

(b) during a subsequent training equalizing interval during field sync component intervals,
    (1) applying a training signal to said signal input of said DFF;

(2) adapting said FFF and said DFF in response to a training error signal representing the difference between a reference training signal and a training signal component of said equalizer output signal;

(c) during a decision-directed equalizing interval following said training interval and comprising non-field sync component intervals,
    (1) applying a symbol slicer output signal to said signal input of said DFF; and
    (2) adapting said FFF and said DFF in response to a slice error signal representing the difference between a symbol slicer output signal and said equalizer output signal.

* * * * *